United States Patent [19]

Wilhite et al.

[11] Patent Number: 4,521,850

[45] Date of Patent: Jun. 4, 1985

[54] INSTRUCTION BUFFER ASSOCIATED WITH A CACHE MEMORY UNIT

[75] Inventors: John E. Wilhite, Glendale; William A. Shelly; Charles P. Ryan, both of Phoenix, all of Ariz.

[73] Assignee: Honeywell Information Systems Inc., Phoenix, Ariz.

[21] Appl. No.: 433,569

[22] Filed: Oct. 4, 1982

Related U.S. Application Data

[63] Continuation of Ser. No. 156,224, Jun. 30, 1980, abandoned, which is a continuation of Ser. No. 866,083, Dec. 30, 1977, abandoned.

[51] Int. Cl.³ .................................................. G06I 9/30
[52] U.S. Cl. .................................................... 364/200
[58] Field of Search .............................. 364/200, 900

[56] References Cited

U.S. PATENT DOCUMENTS

| | | | |
|---|---|---|---|
| 3,401,376 | 9/1968 | Barnes | 364/200 |
| 3,551,895 | 1/1968 | Driscoll | 364/200 |
| 3,764,988 | 10/1973 | Onishi | 364/200 |

*Primary Examiner*—Raulfe B. Zache
*Assistant Examiner*—David Y. Eng
*Attorney, Agent, or Firm*—A. A. Sapelli; L. J. Marhoefer; J. S. Solakian

[57] ABSTRACT

Apparatus and method for providing an improved instruction buffer associated with a cache memory unit. The instruction buffer is utilized to transmit to the control unit of the central processing unit a requested sequence of data groups. In the current invention, the instruction buffer can store two sequences of data groups. The instruction buffer can store the data group sequence for the procedure currently in execution by the data processing unit and can simultaneously store data groups to which transfer, either conditional or unconditional, has been identified in the sequence currently being executed. In addition, the instruction buffer provides signals for use by the central processing unit defining the status of the instruction buffer.

7 Claims, 5 Drawing Figures

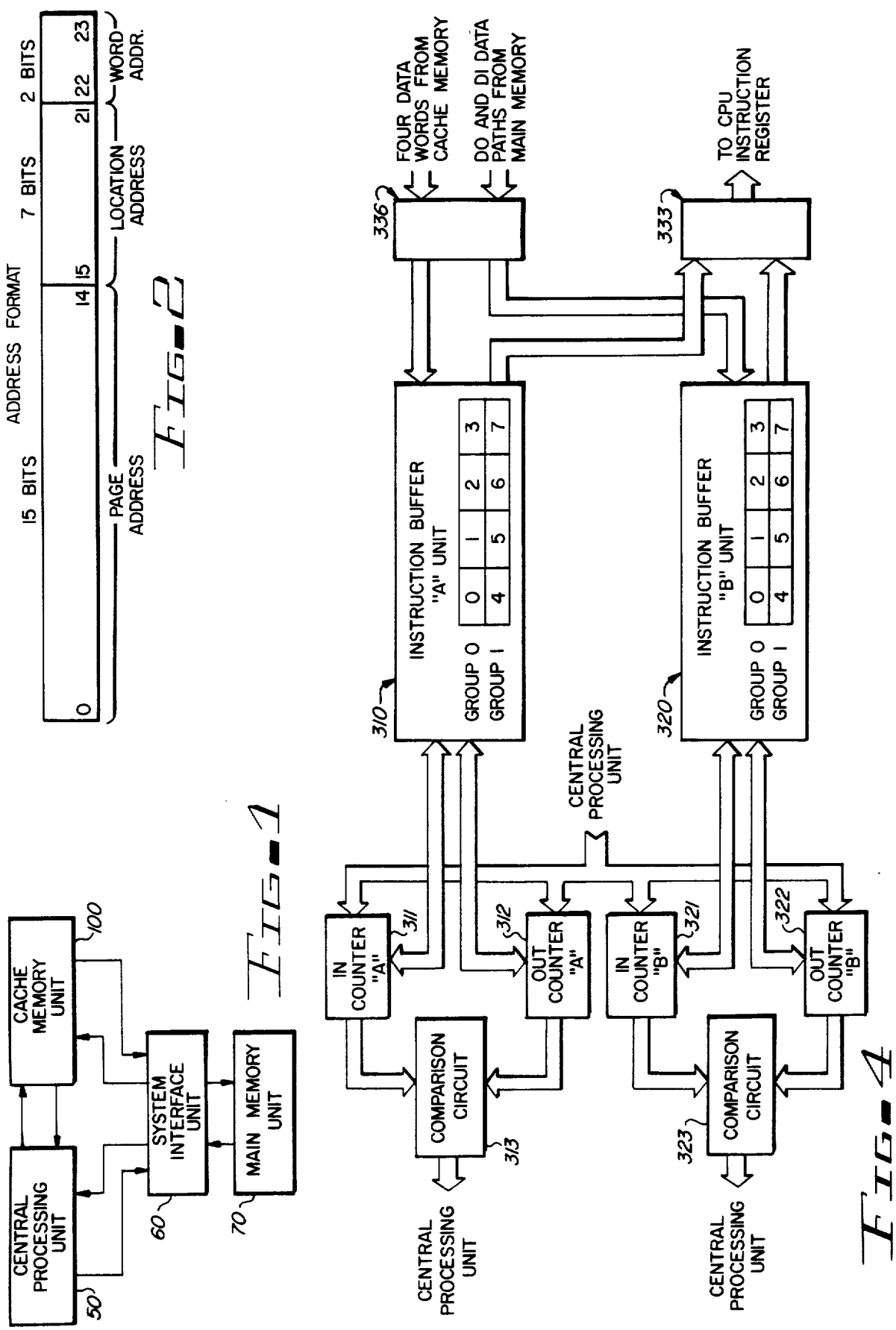

INSTRUCTION BUFFER ASSOCIATED WITH A CACHE MEMORY UNIT

CROSS-REFERENCES TO RELATED APPLICATION

A continuation of application with Ser. No. 06/156,224 filed June 3, 1980 now abandoned, which is a continuation of application with Ser. No. 05/866,083 filed Dec. 30, 1977 now abandoned.

"Data Processing System Programmable Pre-Read Capability" invented by John E. Wilhite, William A. Shelly and Charles P. Ryan, filed on Nov. 22, 1977, now issued as U.S. Pat. No. 4,371,927 and assigned to the assignee of the instant application.

BACKGROUND OF THE INVENTION

1. Field of the Invention

This invention relates generally to data processing systems and more particularly to the instruction buffer which provides instruction for the central processing unit.

2. Description of the Prior Art

With the development of the large data processing systems, there has been a continuing effort to increase the throughput of the central processing system without raising the costs to an unacceptable level. One of the methods of increasing the throughput has been to utilize a cache memory. The cache memory provides a high-speed memory of generally limited capacity which can be physically located near the central processing unit. The cache memory provides the data for which the central processing unit has an immediate requirement.

In addition to the cache memory unit, the high-performance data processing unit typically has an instruction buffer. The instruction buffer provides a small memory to which the control unit of the central processing unit has direct access. The instruction buffer stores the data groups representing instructions just prior to entry of the data groups into the central processing unit.

However, even with the cache memory and the instruction buffer, the performance of the data processing system can be compromised by the transfer from one instruction sequence to a second instruction sequence of the instructions controlling the operation of the central processing unit. To complicate the situation, the transfer of instruction sequences can be conditioned on some event not capable of pre-identification prior to some data manipulations. Thus, it is not possible even upon identification of a transfer instruction to insure that the transfer to the second instruction sequence defined in the transfer instruction is required by the data processing system.

It is therefore, an object of the present invention to provide an improved data processing system.

It is a further object of the present invention to provide apparatus for an improved instruction buffer associated with a central processing unit in a data processing system.

It is a more particular object of the present invention to permit the transfer from one instruction sequence to a second instruction sequence with minimum interruption of the operation of a data processing unit.

It is yet another object of the present invention to provide an instruction buffer containing both a first instruction sequence and a second instruction sequence for use by a data processing system.

It is still another object of the present invention to provide the apparatus for storing a first and a second instruction sequence and apparatus for signalling the status of the storing apparatus.

SUMMARY OF THE INVENTION

The aforementioned and other objects of the present invention are accomplished, according to the present invention, by an instruction buffer which is comprised of two storage units. Each two storage units can store separate instruction sequences. The currently active instruction sequence is indicated by a status register. The status of the storage units are also identified by status signals. The two instruction sequences stored in the buffer storage unit can be the currently active instruction sequences and the instruction sequence identified by a transfer command. The transfer from the currently executing instruction sequence to another instruction sequence by the central processing unit is facilitated because both sequences in the instruction buffer can be available for use by the central processing unit.

These and other features of the invention will become clear upon reading of the specification along with the figures.

BRIEF DESCRIPTION OF THE DRAWINGS

FIG. 1 is a schematic block diagram of a data processing system utilizing a cache memory unit.

FIG. 2 is a schematic diagram of the address format utilized by the data processing system as organized for use in the cache memory unit.

FIG. 4 is a schematic diagram of the organization of the instruction buffer according to the preferred embodiment.

DESCRIPTION OF THE PREFERRED EMBODIMENT

Detailed Description of the Figures

Figure 3:
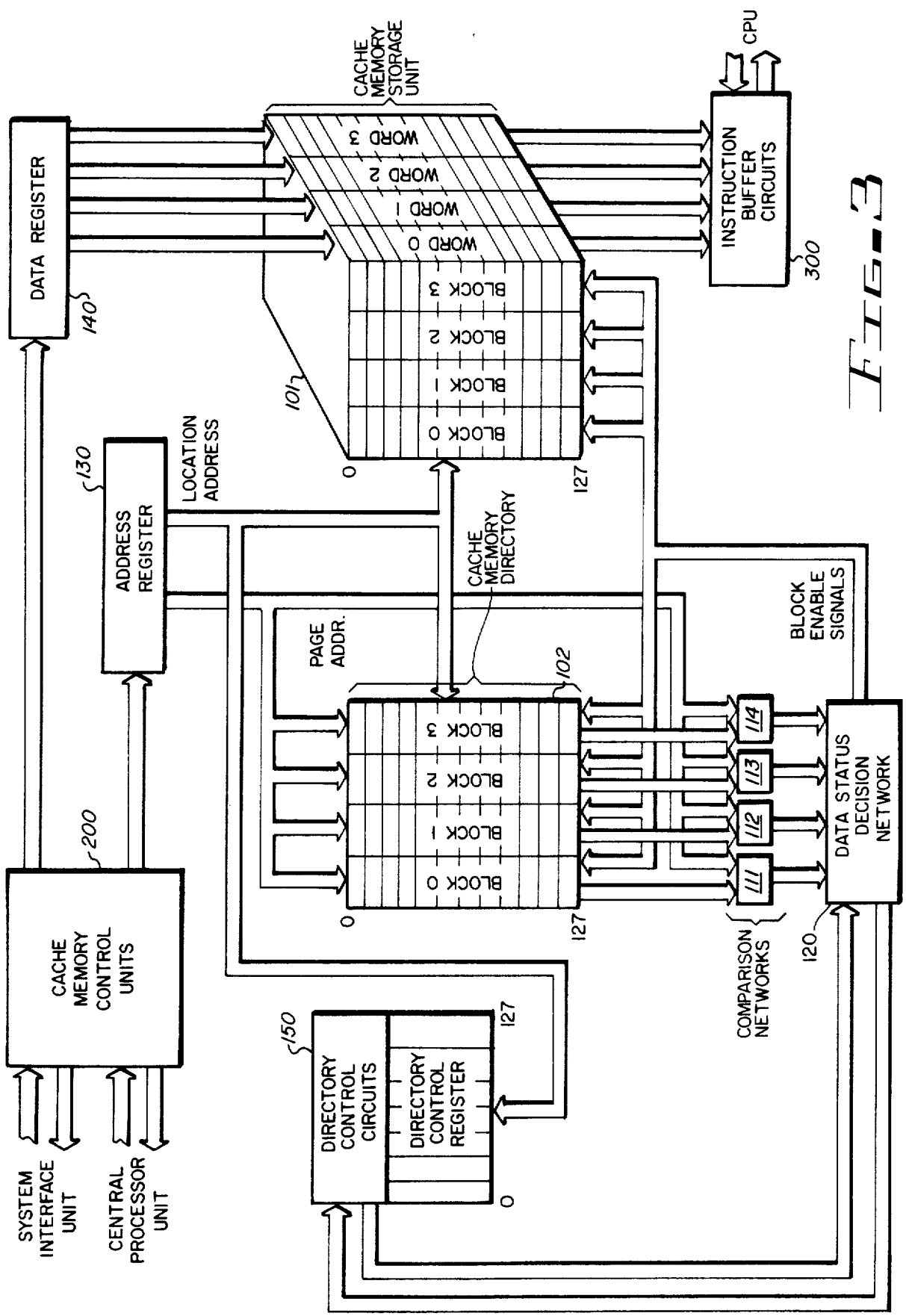
FIG. 3 is a schematic block diagram of the cache memory storage unit showing the general organizational structure.

Referring now to FIG. 1, the general organization of a data processing system utilizing a cache memory unit is shown. A central processing unit 50 is coupled to a cache memory unit 100 and to a system interface unit 60. The system interface unit is coupled to memory unit 70. The central processing unit 50, the memory unit 70, and the system interface unit 60 can be comprised of a plurality of individual units, all appropriately coupled and controlled for accurate execution of signal manipulation.

Referring next to FIG. 2, the format of data address, comprised of 24 binary bits of data, utilized by a data processing system is shown. The first 15 most significant bits identify a page address of data. Each page address of data is comprised of 512 data words. In the present embodiment each word is composed of 40 binary data bits, this number being a matter of design choice. Of the 512 data words identified by the remaining 11 binary bits of each data page, each group of the next 7 binary bits of data is associated with a location of groups of memory storage cells in the cache memory and is a location address in the cache memory. That is, there are 128 memory locations in the cache memory, and each location is identified with a combination of binary bits in the second most significant bit assemblage. The four least significant bit assemblages of the address format, in the present embodiment, are not utilized in identifying a word address in the cache memory unit. For efficient exchange of data between the cache memory unit and the memory unit, a block of four data words is transferred with each data transfer operation. Because the data transfer occurs in blocks, there is no need to utilize the least significant bits in identifying the transferred information to the main memory. The four words comprising the block will, in normal data transfer, always be present in any event. In the illustration in FIG. 2, the address format begins at bit position zero. However, this is a matter of design choice and other address formats can be utilized. Similarly, the address format can contain additional information such as parity or status designations, when the address format is larger (i.e., than 24) groups of binary data bits.

Referring next to FIG. 3, a schematic block diagram of the principal components of a cache memory unit of a data processing system is shown. The data signals in the cache memory unit are stored in cache memory storage unit 101. This memory is comprised of random access memory devices in which data signals can be both read or stored into addressed memory cells and extracted from addressed memory cells. The organization of the cache memory storage unit 101 is such that there are 128 locations, LOCATION 0 through LOCATION 127. For each location, there are four groups of blocks of memory cells labelled BLOCK 0 through BLOCK 3. Each of the four blocks can contain four memory words labelled WORD 0 through WORD 3. Four data words from a selected block of a selected location in the memory storage unit 101 can be applied to the instruction buffer circuit 300 and for subsequent transfer to the data processing unit. Data signals are entered into the storage unit 101 by a data processing unit. Data signals are entered into the storage unit 101 by a data register 140, which is under the control of the cache memory control circuits 200. The cache memory control circuits 200 also control the address register 130. Address register 130 is coupled to the cache memory storage unit 101, the cache memory directory 102, and the cache memory directory control circuits 150. The cache memory directory 102 is divided into four blocks and each block contains 128 storage cells and structure in a manner similar to the storage unit 101, without, however, the additional WORD structure. The cache memory directory is also comprised of random access memory circuits. The contents of the blocks of an addressed location in the memory directory 102 are applied respectively to four comparison networks 111 through 114. The output signals of the comparison networks are applied to the data status decision network 120. The output signals of the data status decision network 120 can be applied to the four blocks of storage cells in the cache memory storage unit and to the four blocks of storage cells located in the cache memory directory in order to activate the block receiving the appropriate signals. The output signals of data status decision network 120 are also applied to the cache memory directory control circuits 150. The address register 130 is also coupled to the four blocks of memory cells of the cache memory directory 102 and to the comparison networks 111 through 114. The cache memory directory control circuits 150 are divided into a directory control register and directory control circuits.

Referring now to FIG. 4, the apparatus comprising the instruction buffer according to the present invention is shown. The instruction buffer consists of two storage unit instruction buffer memory units A, 310, and instruction buffer memory unit B, 320. The two memory units are each comprised of 8 single word (i.e, 40 bit) storage locations, sequentially numbered. The 8 word locations are further divided into two 4 word groups. Thus, a single access from the cache buffer storage unit block will fill the four word group of registers. In the preferred embodiment, the single access to the cache storage unit is referred to as load Instruction Buffer Fetch (LD-IBUF). This instruction will lead in one machine cycle. As shown in FIG. 4, there are 8 locations in each instruction buffer unit so that two load instructions are necessary to fill each unit (i.e., LD-IBUF-IF1 and LD-IBUF-IF2). Similarly, when the data from the main memory via the system interface unit is delivered to the instruction buffer without first being entered into the cache, the words are delivered two words at a time from main memory into either buffer memory A or buffer memory B. In the preferred embodiment, Instruction Buffer A, Instruction Buffer B, switch 333 and switch 336 are part of a random access memory wherein the address of blocks of storage into which data bits are entered or extracted is controlled by counters 311, 312, 321 and 322.

The instruction buffer is generally a part of the central processing unit and is directly controlled by the central processing unit. The central processing unit delivers initialization signals to an in counter A 311 and in counter B 321 to establish the address into which data will be stored. The central processor delivers address signals to out counter A, 312, and out counter B, 322. These counters are coupled to buffer memory A and buffer memory B respectively, and control the location of the data to be delivered to the central processing unit through switch 333. In addition, output signals from in counter A, 311, and from out counter A, 312, are delivered to comparison network 313. Output signals from in counter B, 321, and out counter B, 322, are applied to comparison circuit 323. The comparison circuits 313 and 323 provide the central processing unit and other control circuits with status signals relating to buffer memory A and buffer memory B respectively.

Figure 5:
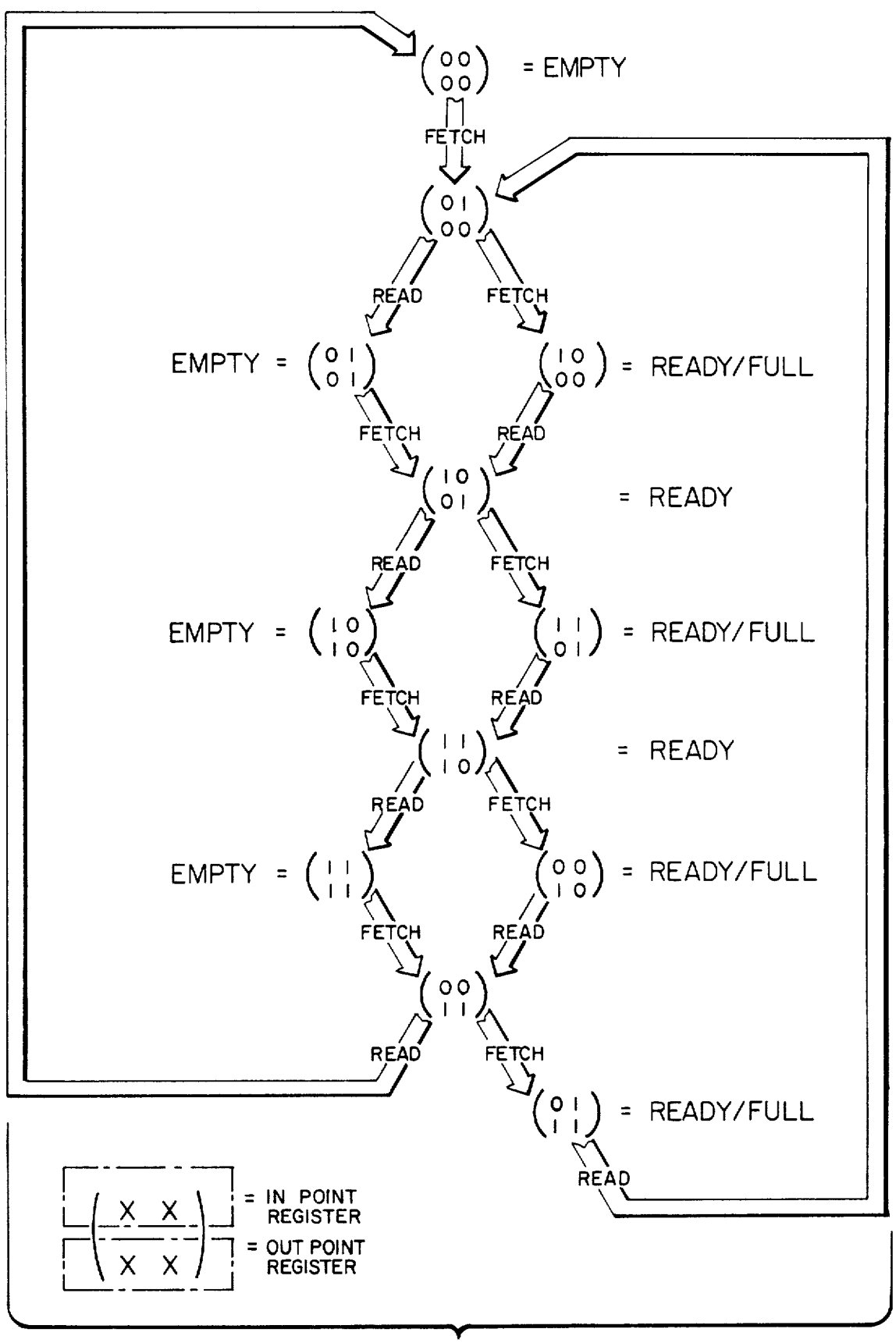
FIG. 5 is a schematic summary of the contents and interpretation of registers associated with the instruction buffer for illustrating the signals transmitted to the central processing unit according to the preferred embodiment.

Referring now to FIG. 5, the possible signals applied to either of the comparison circuits from the associated counters are shown. In addition, the interpretation of the counter signals by the comparison circuit is indicated. The progression in reaching each of the counter states is also shown.

Operation of the Preferred Embodiment

The basic use of a cache memory unit is to make available to the central processing unit data stored in the main memory unit without the wait normally associated with retrieval of the memory unit data. The cache memory is therefore a high speed memory which contains data required with some immediacy by the central processing unit for uninterrupted operation. As shown in FIG. 1, the cache memory is electrically coupled to a central processing unit and to the system interface unit. Similarly, the central processing unit can be coupled directly to the system interface unit in certain data processing systems. The actual utilization of the electrical paths coupling the system components is dependent on the method of operation, for example, in some data processing systems data can be delivered directly to the central processing unit in certain circumstances. In other systems, the data required by the central processing unit must always be delivered to the cache memory unit before being transferred to the central processing unit. As will be clear to those skilled in the art, there are a variety of methods by which the data processing unit can utilize the cache memory for more effective operation.

In the preferred embodiment, an address format of the form shown in FIG. 2 is utilized for defining an address in the main memory unit. The most significant (15) bits, indicate a page address, the second most significant (7) bits indicate a location address, while the 2 least significant bits in conjunction with the other 22 bits identify a specific word or group of data signals stored in main memory. In the preferred embodiment, the least significant bits are not used by the main memory unit in normal operation. In the typical data transfer, four data groups or words are transferred with the issuance of one instruction. Thus, after the central processing unit has developed the main memory address, only the 22 most significant bits are utilized and all of the four words thereby identified are transferred.

After the central processing unit has developed the address of the required data in main memory, that main memory address is delivered to the cache memory control circuits 200 and entered in address register 130.

At this point the cache memory control circuits 200 begin a directory search cycle. The directory search cycle searches for the address of the data requested by the central processing unit in the cache memory unit.

The main memory address is entered in address register 130 as the most significant 15 bits, the page address portion of the address is applied to the four comparison registers 111-114.

Simultaneously the 7 bits of the location address portion of the main memory address are applied to the related one of the 128 locations in the cache memory storage unit, the cache memory directory 102 and the cache memory directory control register of the directory control circuits. The location address enables circuits containing four blocks of data in the cache directory and the directory contents are applied to comparison circuits 111-114. The contents of the 4 blocks of the cache directory are 15 bit page main memory addresses. Thus, when the page address portion of the main memory address in the address register is found in one of the four blocks of the cache directory, a "hit" signal is applied to the data status decision network 120. The "hit" signal indicates that the desired data is stored in the related block of the same location address in the memory storage unit.

The location address portion of address register 130, when applied to the directory control circuits 150, enables the register cell storing status signals and applies these status signals to the decision network 120. In the preferred embodiment, types of status signals utilized are as follows: (1) a full/empty indicator which is a positive signal when valid data is stored in the corresponding cache memory storage unit; (2) a pending bit indicator which is positive when data is in the process of being transferred from main memory to the cache memory storage unit so that page address has already been entered in the cache memory directory; and (3) a failing block indicator which is positive when the related one of the four blocks of memory storage cells has been identified as producing errors in data stored therein.

Assuming that the status signals are appropriate when a "hit" is determined by data status decision network, then the valid data is in the cache memory storage unit. The location address of address register 130 has enabled four blocks of data (each containing 4 words), related to the location address in the cache memory directory. The "hit" in page address one of the four blocks of the cache memory directory indicates that the four data words are located in the related block of the cache memory data storage unit. The data status decision network applies a signal to the appropriate block of the storage unit. When the signals from the central processing unit indicate an LD-IBUF command, the four required data words are deposited in the instruction buffer and each data word is retrieved by the central processing unit as needed. Data required by the central processing unit are applied directly to the unit from the cache storage unit.

The instruction buffer circuits hold those instructions for which the central processing unit has an immediate requirement. When the instruction buffer unit (A or B) has been depleted two central processor time intervals are utilized to refill the now empty instruction buffer unit executing the currently active sequence. However, the extraction of each word stored in the instruction buffer requires one central processing unit cycle. Thus, the total time for the instruction buffer unit (i.e., to fill the unit and then empty the unit) is ten central processing unit cycles. Thus, in the case of sequential storage of instructions, the ideal circumstance, the instruction buffer has seven words stored prior to immediate requirement by the central processing unit.

This type of operation assumes that the central processing unit has a look-ahead or pre-read capability. However, the speed of modern processor can be such that the contents of the cache can, in some cases, be depleted before the required data has been entered into the cache storage unit. In this situation, to expedite delivery of the data to the central processing unit, the data from the main memory can be directly entered into the instruction buffer circuits in the preferred embodiment via $D_0$ and $D_1$ data paths. However, the central processing unit receives signals indicating a "miss" in the cache unit and is prepared for the longer period of time required to extract data from the main memory.

In the preferred embodiment the LD-IBUF-IF1 and LD-IBUF-IF2 commands are generally issued after delivery of the contents of the location 7 to the central processing unit. It has been found that delivery of the command, for example, after completion of the delivery of the contents of storage location 3 can frequently cause control problems for the delivery of signals. In particular, there is a strong possibility of a transfer command occuring in the second group of data transfers causing the most recent request for data to be entered into the buffer to be useless. It is therefore more efficient to enter the data from two cache blocks into the instruction buffer storage locations.

The presence of a transfer of operation from one data sequence to a second data sequence is a frequent occurrence in most programs. The flexibility of programming is to permit the continuation of operation of the data processing regardless of the result of a decision process.

However, to cause the minimum interruption in the processing operation, the new sequence must be available. That is, the new sequence should be available regardless of whether a conditional or unconditional transfer is identified.

The transfer of a data sequence, whether conditional or unconditional, is identified by the central processing unit. This identification of the transfer, along with the identification of the second sequence of information streams can be available to the central processing unit by interpretation of instruction format. However, because the typical instruction contains a single register group which can be addressed by the central processing unit, the new instruction sequence entered prior to continuation of the data sequence execution.

To process efficiently the conditional and unconditional transfer of data, the instruction buffer in the present invention is comprised of two register groups. One register group, and it can be either register group, is devoted to storing the instruction in the current execution sequence. Once a transfer instruction is identified, and the sequence to which the transfer, if accomplished, takes place is similarly identified, then the central processing system transmits a LD-IBUF-IF1 and LD-IBUF-IF2 to the cache memory. This identification and request to cache takes place in a manner equivalent to a normal loading of the instruction buffer except that the loading takes place in the currently unused instruction buffer A. This operation takes two central processing unit cycles to complete. It has been determined that a majority of the transfer instructions result in a change of the sequence currently being executed. Thus the fetch instructions are executed immediately upon identification even though the conditional transfer can result in the current sequence continuing to be executed.

After the instruction indicating the sequence transfer is executed in the memory, the sequence of instruction which is identified is available for execution. The access to either register unit of the instruction buffer, either for storage or for extraction of data is the result of signals exchanged between the associated counter and the central processing unit. The signals from the central processing unit enable the correct group of four register storage locations in the currently active instruction buffer unit via the associated in counter to receive data and the current single word location in the currently active register via the associated out counter for transfer of data to the central processing unit. After each word is extracted in sequence, from a register unit, the counter applies an appropriate signal to the associated comparison circuit. Because the data is entered in four data word blocks, but extracted by individual data words, the associated counter must take account of the discrepancy in delivering signals to the comparison networks (or the comparison networks should have the appropriate circuit). The signals from the comparison networks identify the status of the associated instruction buffer unit to the central processing unit.

FIG. 5 provides a synopsis of the in counter and out counter signals possible in the preferred embodiment. The activity involving the register for each group is compared via comparison networks. The status signals associated with each group of register signals is also shown in FIG. 5. For example, when the contents of the counters are equal, it is clear that the same number of data words has been extracted from the buffer unit as has been previously entered therein.

In the preferred embodiment, although the instruction buffer is generally considered to be part of the central processing unit, the buffer is physically associated with the cache memory unit. This relationship is to enable the cache to apply a 4 data word block to the instruction buffer during one central processing unit cycle. The central processing unit extracts one data word at a time in sequence from the instruction buffer during one central processing unit cycle. Thus, when the ability to locate the cache in the immediate proximity of (i.e., one the same board(s) as the central processing unit), there will be few electrical leads required.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. In a data processing system having a central processing unit, an instruction register, and an associated cache memory unit, buffer apparatus for a sequence of instructions being transferred from said cache memory unit to said instruction register comprising:

a first plurality of groups of storage locations for a temporary storage of a first sequence of instructions from said cache memory to be supplied to said instruction register;

first counter means, responsive to signals from said central processing unit, to indicate when a one of said first plurality of groups of storage locations has received a portion of said first sequence of instructions;

second counter means responsive to signals from said central processing unit, to indicate when contents of a preselected one of said first groups of storage locations has been transferred to said instruction register;

first comparison means responsive to signals from said first counter means and second counter means, said first comparison means signalling said central processing unit a status of said first plurality of groups of storage locations indicating which of said locations is available for signal storage;

a second plurality of groups of storage locations for temporary storage of groups of alternative sequence of instructions from said cache memory to be supplied to said instruction register;

third counter means, responsive to signals from said central processing unit, to indicate when a one of said second plurality of groups of storage locations has received a portion of said group alternative sequence of instructions from said cache memory;

fourth counter means, responsive to signals from said central processing unit, to indicate when said contents of a preselected one of said second group of storage locations had been transferred to said instruction register;

second comparison means responsive to signals from said third counter means and fourth counter means, said second comparison means signalling said central processing unit a status of said second group of storage locations wherein said status of said second plurality of group storage locations indicates which of the locations is available for signal storage.

2. In a data processing system having a central processing unit, an instruction register, and an associated cache memory unit, buffer apparatus for a sequence of instructions being transferred from the cache memory unit to the instruction register, as recited in claim 1, wherein said first comparison means comprises:

means responsive to signals stored in said first counter means and second counter means for indicating to said central processing unit for said first plurality of groups of storage locations whether each of said first plurality of storage groups is full, empty or partially full; said central processing unit causing sequential instruction words to be stored in empty groups of said first plurality of storage locations.

3. In a data processing system having a central processing unit, an instruction register, and an associated cache memory unit, buffer apparatus for a sequence of instructions being transferred from the cache memory unit to the instruction register, as recited in claim 1, wherein said first and said second plurality of groups of storage locations each include two groups of storage locations, and wherein said first, said second, said third and said fourth counter means each include two-bit counters.

4. In a data processing system having a central processing unit, an instruction register, and an associated cache memory unit, buffer apparatus for a sequence of instructions being transferred from the cache memory unit to the instruction register, as recited in claim 1, wherein said counter means comprises:

a two-bit counter, said counter size determined by the number of plurality of groups of storage locations.

5. In a data processing system having an instruction register, main memory, and a cache memory, apparatus for having available an alternative sequence of data from the cache memory to the instruction register, said alternative sequence data applied to said data processing system in response to a predetermined condition, comprising:

a first buffer storage device for the temporary storage of a sequence of data from said main memory for subsequent transfer to said instruction register said first storage device including at least two groups of storage locations;

a first status circuit to signal a status of said first buffer storage device to the data processing system, said first status circuit indicating whether a one of the group of storage locations is available in said first storage device for storage of instruction words;

a second buffer storage device for temporary storage of said alternative sequence of data from said main memory for subsequent transfer to said instruction register, said second storage device including at least two groups of storage locations;

a second status circuit to signal a status of said second buffer storage device to the data processing system said second status circuit indicating whether a group of storage locations is available in said second storage device, wherein said first and second status circuits include:

a first set of counters responsive to signals from said data processing system for incrementing a one of said set of counters related to a one of said bufer storage devices when data is entered in said related group of buffer storage device locations, a second set of counters responsive to signals from said data processing system for incrementing a one of said set of counters related to a one of said buffer storage devices when data is extracted from said related buffer storage device locations; and a first and second comparison circuits, responsive to the contents of said first and second set of counters, to signal said data processing system a ready, full or empty status of said related buffer storage devices, said status of said first and second storage buffer devices determining activity of said data processing unit in transferring data to said first and said second buffer storage devices.

6. In a data processing system having a main memory, a cache memory, an instruction register, a first and second buffer storage area, each storage area having a plurality of groups of storage locations, status circuits associated with each of said buffer storage areas comprising:

first counting means coupled to the data processing system, said first counting means being incremented for each transfer of a predetermined sequence of data from a storage location group to said instruction register;

second counting means coupled to the data processing system, said second counting means being incremented for each transfer to a buffer storage area location group of a sequence of data;

comparison means, coupled to said data processing system, and to said first and second counting means for indicating to said data processing system that storage locations within a buffer storage area are fully occupied, partially occupied or not occupied with data awaiting transfer to said instruction register; wherein said comparison means produces status signals determined by a difference between groups of storage locations occupied in each buffer storage area and groups of storage locations data removed from each buffer storage area.

7. The status circuits of claim 6 wherein said first and said second counting means include a two-bit counter, and wherein said plurality of groups of storage locations includes two groups.

* * * * *